March 17, 1953  A. R. WINDIATE  2,631,409

ILLUMINATED FLOWER ARRANGEMENT

Filed Aug. 8, 1949

ALICE R. WINDIATE,
INVENTOR.

BY W. E. Beatty
ATTORNEY.

Patented Mar. 17, 1953

2,631,409

UNITED STATES PATENT OFFICE 2,631,409

ILLUMINATED FLOWER ARRANGEMENT

Alice R. Windiate, Santa Ana, Calif.

Application August 8, 1949, Serial No. 109,197

1 Claim. (Cl. 47—41)

The invention relates to an illuminated flower arrangement employing a transparent container for water in which the flowers are immersed, with means for illuminating the water and flowers.

An object of the present invention is to provide an improvement in the manner of supporting the flowers and the container in position and to an improvement in the manner of supporting a transparent plate preferably a colored plate in position on an illuminated base.

While it is old to provide a globe of water as a container for a floral display, there is the disadvantage that the globe initially must be turned upside down so that its mouth is uppermost. When filled with water, the floral arrangement is turned upside down and immersed in the globe and then the whole device is righted whereupon the flowers have a tendency to float upwardly in the water off of their support. The position of the floral display is not readily adjustable to position it properly in the container. Also the cover is apt to slip off from the mouth of the container which allows water to run out and admit air, necessitating going through the whole procedure again in order to obtain the desired result. These disadvantages are overcome by the present invention.

A further object of the invention is to provide a construction which is simple and wherein various colored effects may be obtained by simply substituting one color filter for another.

A further object of the invention is to provide an improved means for holding the floral display in any desired position on an invertible cover, so that the position of the base of the display may be adjusted as desired and so that the floral display will not float upwardly when the container is turned from an upside down to an upright position.

A further object is to provide an improved means for holding the container and its cover together, the two being attachable with minimum disturbance of the floral display which at that time is upside down and immersed in the water in the container. A further object is to provide an improved means for supporting the assembled container with floral display and cover with respect to a source of illumination such as an electric lamp.

For further details of the invention reference may be made to the drawings wherein Fig. 1 is a side view in elevation on a reduced scale, of an illuminated floral arrangement according to the present invention.

Figure 1:
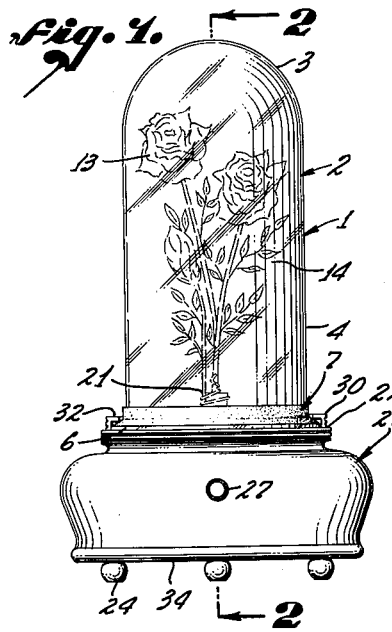
Figure 2:
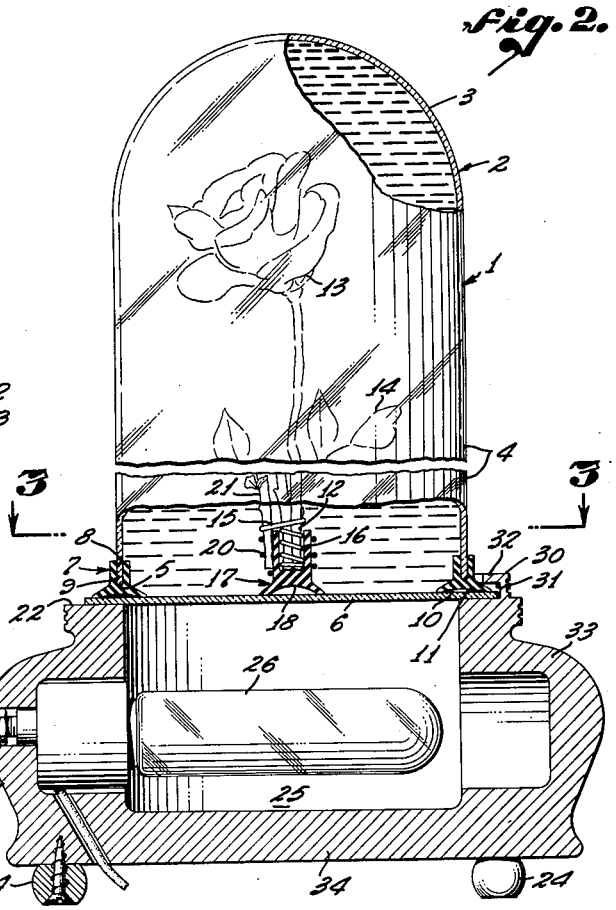
Fig. 2 is an enlarged sectional view on line 2—2 of Fig. 1 looking in the direction of the arrows.
Figure 3:
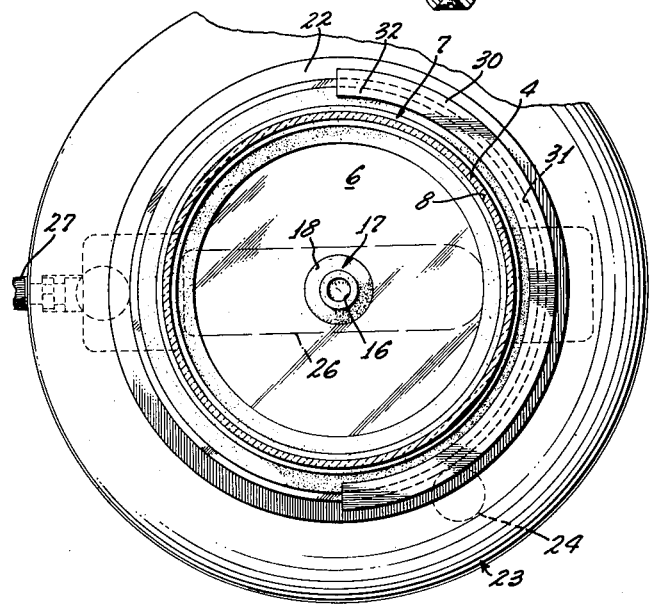
Fig. 3 is an enlarged sectional view on line 3—3 of Fig. 2 looking in the direction of the arrows.

While various dimensions and proportions may be employed, by way of example the over-all height of the floral arrangement 1 in Fig. 1 may be about 15 inches with other parts in proportion. The arrangement 1 comprises a tubular globe 2 of glass or other transparent material having a rounded closed top 3, a cylindrical side wall 4 and an open bottom 5. The bottom 5 is covered by and adapted to rest on a circular plate 6 of glass or other transparent material and also of any desired color to act as a color filter for lamp 26. The globe 2 and the plate 6 are removably secured together by an annular rubber suction cup device 7 having an outwardly facing annular groove 8 to receive the margin 9 of the globe and prevent leakage. The suction device 7 has an inwardly facing annular suction cup area 10 which extends on opposite sides of the groove 8 and which is adapted to fit the marginal portion 11 of the plate 6. Suction cup device 7 prevents plate 6 from sliding off of bottom 5 when righting the inverted container 2 filled with water with cover 6 in position.

The stem ends 12 of flowers indicated at 13 and leaves indicated at 14 are bound together by winding a copper wire 15 thereon. The stem ends 12 thus bound together are made into a bundle small enough to fit into the outwardly facing cup 16 on a rubber suction device 17 which serves as a frog. The stems 12 thus bound with the wire 15 and with a free length of the wire 15 extending therefrom is inserted in the cup 16 and then the free length of the wire is bound around the outside of the cup 16 as indicated at 20 to hold the stem ends 12 in the cup 16 so that the floral display will not fall off when cover 6 is turned upside down or float off therefrom when upright. At the time that the wire portion 20 is bound around the cup 16, additional leaves or flowers may be added to the outside of the cup and bound by the wire 20 as indicated at 21. The cup 16 of the frog 17 outwardly projects from an inwardly facing suction cup 18 which is readily applied and adheres to any suitable position on top of the flat plate 6.

The flat plate 6 when in position as a cover for container 2, slidably fits on the flat top 22 of a base 23. Base 23 has suitable feet indicated at 24. The base 23 has a recess 25 having an electric lamp 26 operated by a switch 27. The plate 6 with frog 17 and suction device 7 thereon is slidable onto or off from the top 22. The top 22 has a semicircular flange 30 having a recess 31, formed by an overhang 32, to receive the corresponding semicircular periphery of the suction cup 7 and the margin 11 of the plate 6. The flange 30 acts as a stop to locate the plate 6 and the container 2 in position so that the illuminated recess 25 is in register with the area of plate 6 within the suction cup device 7.

Base 23 is of opaque material such as one piece of wood, with integral side and bottom walls 33, 34 having no holes for leakage of light from lamp 26.

Various modifications may be made in the invention without departing from the spirit of the following claim.

I claim:

A floral display device comprising a base having an upwardly extending wall provided with a flat edge surface defining an opening adapted to receive a source of light, a transparent colored plate seated on said flat edge surface and completely covering said opening, a transparent liquid container having a wide mouthed opening at one end, a suction element having a groove complemental to the peripheral edge portion of said container at its opening receiving the same in fluid tight engagement, a flower holding frog provided with a suction cup adapted for attachment to the upper surface of said transparent plate, a segmental flange on the flat edge surface of said base wall having an overhang, said suction element securing said liquid container in inverted position to the upper surface of said transparent plate in surrounding relation to said flower holding frog, said assembled transparent plate with attached flower holding frog and liquid container being mounted as a unit on said base by a sliding movement of said transparent plate along the flat edge surface of said base wall, said flange constituting a stop to limit the sliding movement of said transparent plate and said overhang on said flanges formed to extend over a peripheral portion of said suction element and a corresponding edge of said transverse plate.

ALICE R. WINDIATE.

REFERENCES CITED

The following references are of record in the file of this patent:

UNITED STATES PATENTS

| Number | Name | Date |
| --- | --- | --- |
| 84,445 | Stigale | Nov. 24, 1868 |
| 1,043,557 | Young | Nov. 5, 1912 |
| 1,513,841 | MacDonald | Nov. 4, 1924 |
| 1,681,040 | Kemp | Aug. 14, 1928 |
| 1,942,477 | Jacobus | Jan. 9, 1934 |
| 2,003,101 | Asman | May 28, 1935 |
| 2,429,958 | Liebman | Oct. 28, 1947 |

FOREIGN PATENTS

| Number | Country | Date |
| --- | --- | --- |
| 11,863 | Great Britain | A. D. 1911 |
| 335,981 | Great Britain | Oct. 6, 1930 |
| 375,926 | Great Britain | July 7, 1932 |
| 161,757 | Switzerland | July 17, 1933 |